(12) United States Patent
Brose et al.

(10) Patent No.: US 10,690,178 B2
(45) Date of Patent: Jun. 23, 2020

(54) FASTENING UNIT AND MODULES

(71) Applicant: SATA GmbH & Co. KG, Kornwestheim (DE)

(72) Inventors: Jens Brose, Ottmarsheim (DE); Ralf Gehrung, Stuttgart (DE)

(73) Assignee: SATA GmbH & CO. KG, Kornwestheim (DE)

( * ) Notice: Subject to any disclaimer, the term of this patent is extended or adjusted under 35 U.S.C. 154(b) by 393 days.

(21) Appl. No.: 15/506,744

(22) PCT Filed: Aug. 25, 2015

(86) PCT No.: PCT/EP2015/001728
§ 371 (c)(1),
(2) Date: Feb. 26, 2017

(87) PCT Pub. No.: WO2016/030011
PCT Pub. Date: Mar. 3, 2016

(65) Prior Publication Data
US 2017/0254356 A1    Sep. 7, 2017

(30) Foreign Application Priority Data

Aug. 26, 2014  (CN) .................... 2014 2 0486168 U
Aug. 26, 2014  (CN) .................... 2014 2 0486205 U
Aug. 26, 2014  (CN) .................... 2014 2 0486221 U

(51) Int. Cl.
*F16C 11/04*    (2006.01)
*A62B 9/04*    (2006.01)
(Continued)

(52) U.S. Cl.
CPC ............... *F16C 11/04* (2013.01); *A62B 7/02* (2013.01); *A62B 9/04* (2013.01); *A62B 17/04* (2013.01);
(Continued)

(58) Field of Classification Search
CPC ......... A45F 2005/025; A45F 2005/026; B05B 7/2491; B05B 7/2416; A62B 17/04; A62B 9/04; A62B 18/02; F16C 11/04
See application file for complete search history.

(56) References Cited

U.S. PATENT DOCUMENTS 3,949,966 A      4/1976  Fabish
8,333,310 B2 *  12/2012  Tages ...................... A45F 5/02
                                                                    224/197
(Continued)

FOREIGN PATENT DOCUMENTS

EP        0747095 A2    12/1996
WO        0077469 A1    12/2000
(Continued)

OTHER PUBLICATIONS

English translation of the International Preliminary Report on Patentability and Written Opinion for PCT/EP2015/001728 filed Aug. 25, 2015.
(Continued)

*Primary Examiner* — Bradley J Osinski
(74) *Attorney, Agent, or Firm* — Paul D. Bianco; Gary S. Winer; Fleit Intellectual Property Law

(57) ABSTRACT

A fastening unit, in particular a fastening unit for modules which are intended to supply a user of a breathing mask or breathing hood with breathable air, and to such modules. The fastening unit is designed to secure one module relative to another module, and has a first component part for assembly with the other module and a second component part for assembly with the module. The second component part is rotatable, by means of the first component part, about a predetermined angle relative to the first component part;
(Continued)

and first and second subcomponents within the region of the defined angle can engage with each other in a plurality of positions.

59 Claims, 15 Drawing Sheets

(51) Int. Cl.
  *A62B 7/02* (2006.01)
  *A62B 17/04* (2006.01)
  *A62B 18/02* (2006.01)
  *B05B 9/04* (2006.01)
  *B05B 7/24* (2006.01)

(52) U.S. Cl.
  CPC ............... *A62B 18/02* (2013.01); *B05B 9/04* (2013.01); *B05B 7/2416* (2013.01); *B05B 7/2491* (2013.01)

(56) References Cited

U.S. PATENT DOCUMENTS

| | | |
|---|---|---|
| 8,584,916 B1 | 11/2013 | Chen |
| 2003/0160075 A1 | 8/2003 | Musarella et al. |
| 2006/0032647 A1 | 2/2006 | Petty |
| 2006/0065261 A1 | 3/2006 | Files |
| 2006/0237495 A1* | 10/2006 | Chen .................. A45F 5/02 224/197 |
| 2007/0023468 A1 | 2/2007 | Ford |
| 2008/0203124 A1 | 8/2008 | Gorings |
| 2008/0257928 A1 | 10/2008 | Lowry et al. |
| 2010/0276463 A1* | 11/2010 | Gregory ............ F41C 33/045 224/198 |

FOREIGN PATENT DOCUMENTS

| | | |
|---|---|---|
| WO | 0197914 A1 | 12/2001 |
| WO | 2009048584 A1 | 4/2009 |
| WO | 2014/012064 A2 | 1/2014 |

OTHER PUBLICATIONS

International Search Report dated Mar. 16, 2016 for PCT/EP2015/001728 filed Aug. 25, 2015.

Written Opinion dated Mar. 29, 2016 for PCT/EP2015/001728 filed Aug. 25, 2015.

* cited by examiner

FASTENING UNIT AND MODULES

TECHNICAL FIELD

The present invention relates to a fastening unit, in particular a fastening unit for modules that are intended to supply a user of a breathing mask or breathing hood with breathable air, and to such modules.

TECHNICAL BACKGROUND OF THE INVENTION

In painting applications in which spray guns operated with compressed air and using solvents are used, it is inevitable for so-called "overspray" to occur. This means that the working area is contaminated with an undesirable amount of paint or paint droplets, which is also extremely harmful to the human body. It is therefore necessary to provide health protection for the workers. Breathing hoods, which can preferably be secured over the whole head and, in particular, over the whole face of the worker, are exceptionally well-suited to this purpose and offer maximum health protection. Breathing hoods of this type are generally supplied with compressed air independently of the ambient air. To this end, as a rule, first compressed air is fed to an air processing system, which first of all comprises a single-stage or a multi-stage filtration system. Subsequently, the filtered air is fed via a compressed air hose to a waist strap, or a hip belt which, as a rule, is fitted with at least one additional auxiliary air processing module. One air processing module may be an activated charcoal adsorbent, another air processing module may be an air heater module or an air humidifier module. The activated charcoal adsorbent module makes it possible to remove undesirable vapors and gases, which may still be contained in the compressed air. An air heater module and/or an air humidifier module offer(s) additional benefits for health and well-being. Another useful embodiment proposes to attach an air regulator module and an air distributor module to the waist strap or hip belt. The overall structure is generally referred to as belt unit. This type of useful belt unit is used in combination with a breathing hood known under the product name "Vision 2000" of SATA GmbH & Co. KG.

Today, users of respiratory protection systems impose increasingly higher demands on ensuring health protection and user friendliness. On the other hand, manufacturers and producers of component parts want products which can be easily manufactured, easily installed and, if necessary, easily removed.

OBJECT OF THE INVENTION

The object of the present invention is to suggest a possible way of solving the problems outlined above.

SOLUTION OF THE PROBLEM OF THE INVENTION

This problem is solved by a fastening unit with the features of claim 1. The fastening unit according to the present invention makes it possible to easily and securely install and remove various modules which are, in particular, designed to improve the supply of breathable air to a user of a breathing; mask or breathing hood.

Further details and embodiments of the invention follow from the dependent claims and from the drawings described below.

The fastening unit according to the present invention is designed to easily secure and subsequently to easily remove an air processing module, especially to and from a waist strap or hip belt, which is worn by a workman, such as a spray painter, who is wearing an air supplied breathing mask or breathing hood in a spray booth.

BRIEF DESCRIPTION OF THE DRAWINGS

The appended drawings are an integral part of the description and are provided to explain the present invention in greater detail. They illustrate possible embodiments of the present invention and serve to explain the principles of the present invention in conjunction with the description. In the appended drawings, components having identical functions are identified by identical reference characters.

In the drawings.

DETAILED DESCRIPTION OF THE EMBODIMENTS

Figure 1A:
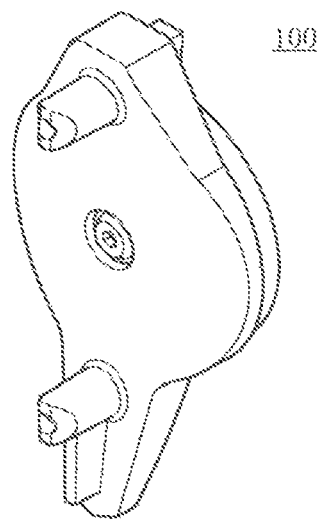
FIGS. 1A and 1B are perspective views of a global fastening unit according to the present invention.
Figure 1B:
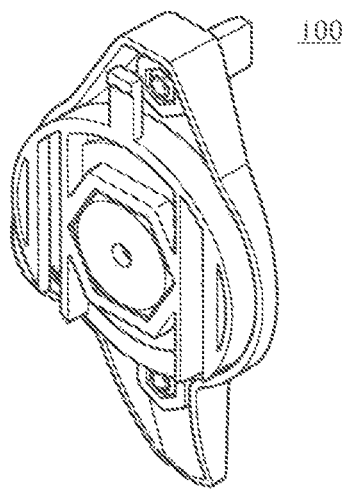

The following detailed description should be understood with reference to the drawings which are an integral part of the description and which, by way of an example, illustrate the possibilities offered by the present invention. In the drawings, directional information, such as top, bottom, inside and outside, should be understood with reference to the drawings described. Components of the embodiments of the invention can be configured in a plurality of different directions, which is to say that the directional information is used only for the purpose of illustration and does not imply any limitations. The description should also be understood to mean that different embodiments are possible, and structural or logical modifications are based on the premise that they are allowed in accordance with the scope of the invention. This means that the following detailed description is not to be understood to imply a limitation. It is obvious that features of the different embodiments described below can be combined with each other, unless specifically stated otherwise As FIGS. 1A and 1B, and FIGS. 2A and 2B show the fastening unit 100 according to the present invention comprises a first component part 1, a second component part 2, a first screw 3 with a first head part and a first hollow screw extension, a spring 4 and a second screw 5 with a second head part and a second screw extension.

Figure 2A:
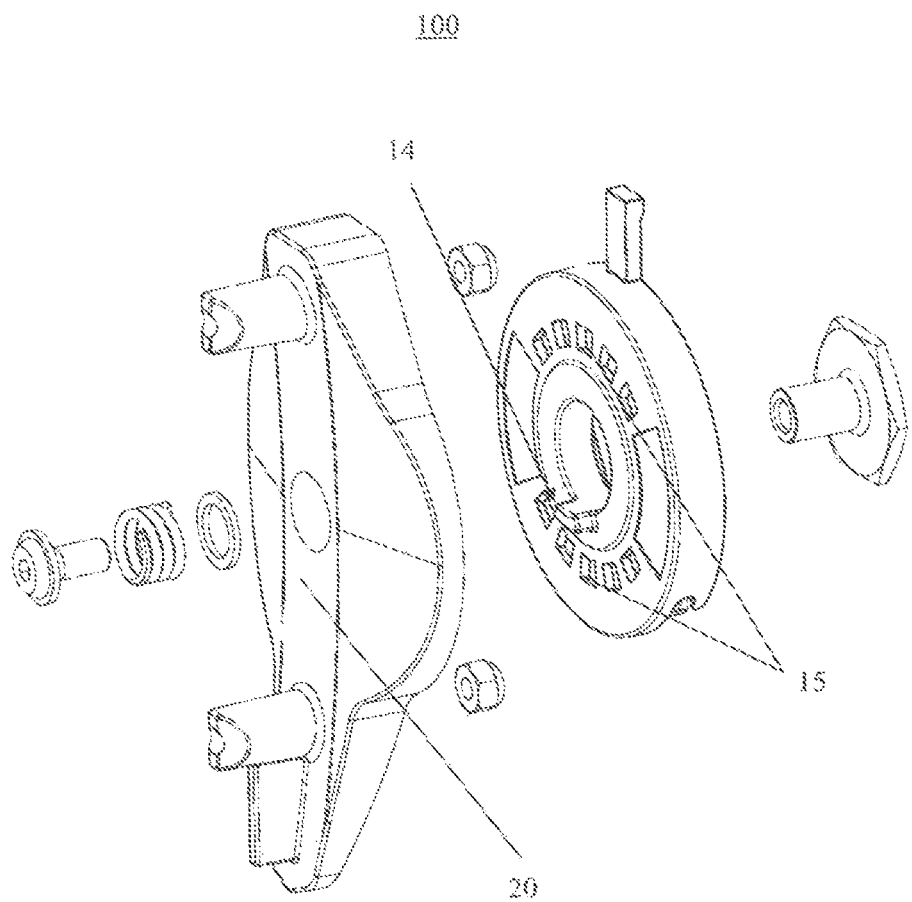
FIGS. 2A and 2B are exploded views of the global fastening unit.
Figure 2B:
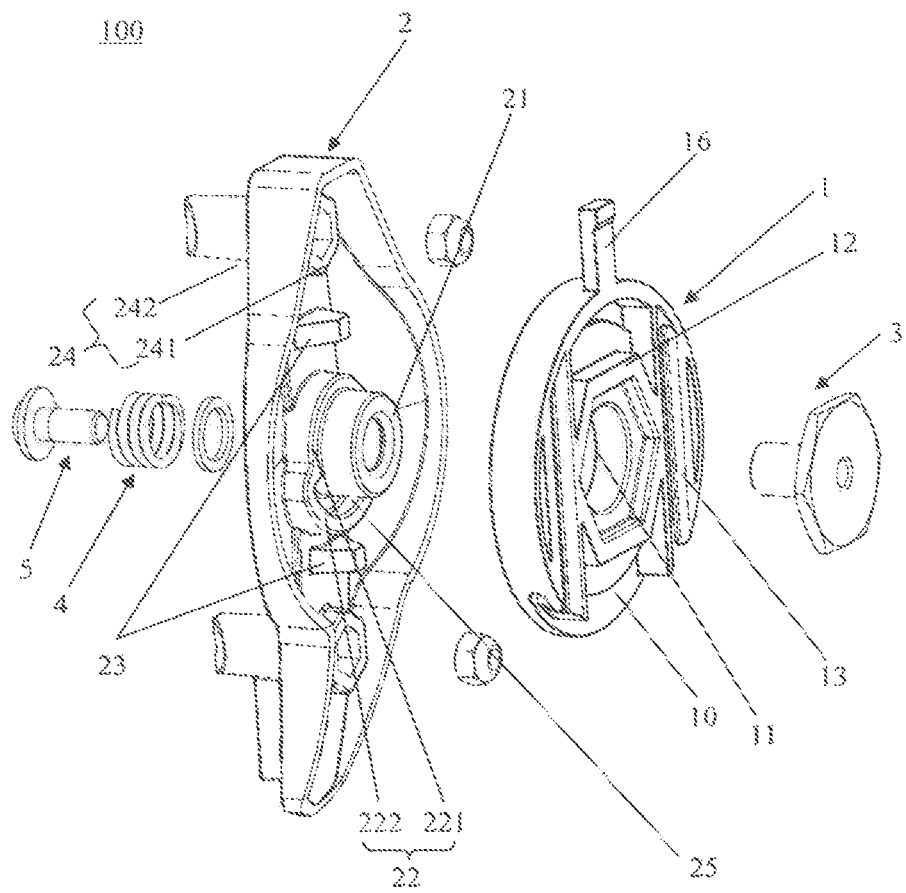

The first component part 1 has a substantially cylindrical contour and, as indicated in FIGS. 2A and 2B, comprises a first substrate 10 with a first surface and a second surface disposed opposite to the first surface. A central through-hole 11 passes through the first substrate 10. A hexagonal frame 12 is disposed around the central through-hole 11 and on the first surface. A stop 14 and locking grooves 15 disposed on the second surface, as well as an outwardly oriented projection 13 and 16 define the first component part 1.

As FIGS. 2A and 2B show, the second component part 2 comprises a second substrate 20 with a first surface and a second surface disposed opposite to the first surface. A first hollow projection 21 projects outwardly from the first surface and passes through the second substrate 20. In addition, there is a second projection 22, the diameter of which is larger than that of the first projection 21, the height of which, however, is shorter than that of the first projection 21, with the second projection 22 enclosing the first projection 21. Dedicated to the projection 21 are two locking pins 23, which are able to engage the locking grooves 15 of the first component part 1 so as to lock the second component part 2 in place in a specific engaged position. A fastening part 24 can be inserted into a fastening hole of a module, e.g., an air regulator module, to jointly fasten it to another component or object.

In addition, as FIGS. 2A and 2B show, the second projection 22 comprises a first section 221 and a second section 222, with an inner circumferential wall of the first section 221 on an outer peripheral wall of the first projection 21 and an inner circumferential wall of the second section 222 and an outer circumferential wall of the first projection 21 defining a guiding groove 25 for receiving a stop 14. The first section 221, the second section 222, the first projection 21 and the stop 14 are coordinated relative to each other so that the second component part 2 can be rotated about an angle which is a predefined angle relative to the first component part, with the predefined angle being less than 180 degrees.

As indicated in FIGS. 1A, 1B and FIGS. 2A, 2B, the first screw 3 is sequentially inserted into the through-bore 11 and subsequently into a hollow portion of the first projection 21 from a side where the first component part 1 is disposed. The spring 4, into which the second screw 5 is inserted, is sequentially introduced into an assembled hollow portion of the first projection 21 from a side where the second component part 2 is disposed so that the first hollow screw extension of the first screw 3 receives the second hollow screw extension of the second screw 5 and the spring 4 encloses the first screw extension of the first screw 3. In addition, a seal between the head part of the first screw 3 and the spring 4 can be provided as well. The first component part 1 and the second component part 2 are assembled in such a way that the stop 14 of the first component part 1 is received in the guide groove 25 of the second component part 2 and the locking pins 23 of the second component part 2 are locked in place in the locking grooves 15 of the first component part 1.

Furthermore, as shown in FIG. 2A, five locking grooves are configured into an upper portion of the second surface of the first substrate 10 and five locking grooves are configured into a lower portion of the second surface of the first substrate 10 and disposed symmetrically about a central axis of the central through-hole 11. In addition, in conformity with the guide groove 25 of the second component part 2, the five locking grooves on the lower surface are aligned to conform to a peripheral region which is defined by the second surface.

In the fastening unit 100 configured as described above, the second component part 2 can be rotated and when the locking pins 23 of the second component part 2 interact with the locking grooves 15 of the first component part 1 as a result of an expansion of the spring 4. The locking pins 23 of the second component part 2 can engage in other locking grooves 15, which makes it possible for the second component part 2 to engage the first component part 1 in a plurality of positions. In addition, the inner circumferential wall of the first section 221 of the second projection 22 is near the outer peripheral wall of the first projection 21, and the guide groove 25 is between the inner circumferential wall of the second section 222 and the outer circumferential wall of the first projection 21 so that the stop 14 of the first component part 1 is able to move in the guide groove 25, and the rotatable angular range of the second component part 2 relative to the first component part 1 is limited, which prevents the additional auxiliary module on the fastening unit 100 from being rotated into an undesired position.

As mentioned earlier, the five pairs of symmetrical locking grooves are configured in the first component part 1 in such a manner that the second component part 2 has five engaged position relative to the first component part 1. As can be seen in FIGS. 5A to 5E, the second component part can be rotated about 22.5 degrees, −22.5 degrees, 45 degrees and −45 degrees relative to the first component part and can be locked in place in the respective positions.

As shown in FIGS. 2A and 2B, the fastening part 24 comprises a third hollow section 241 and a fourth hollow section 242, with the third section 241 being positioned on the same surface as the first projection 21. On the second substrate 20, the fourth section 242 is positioned on the surface disposed opposite to the first projection 21 of the second substrate 20.

Figure 3:
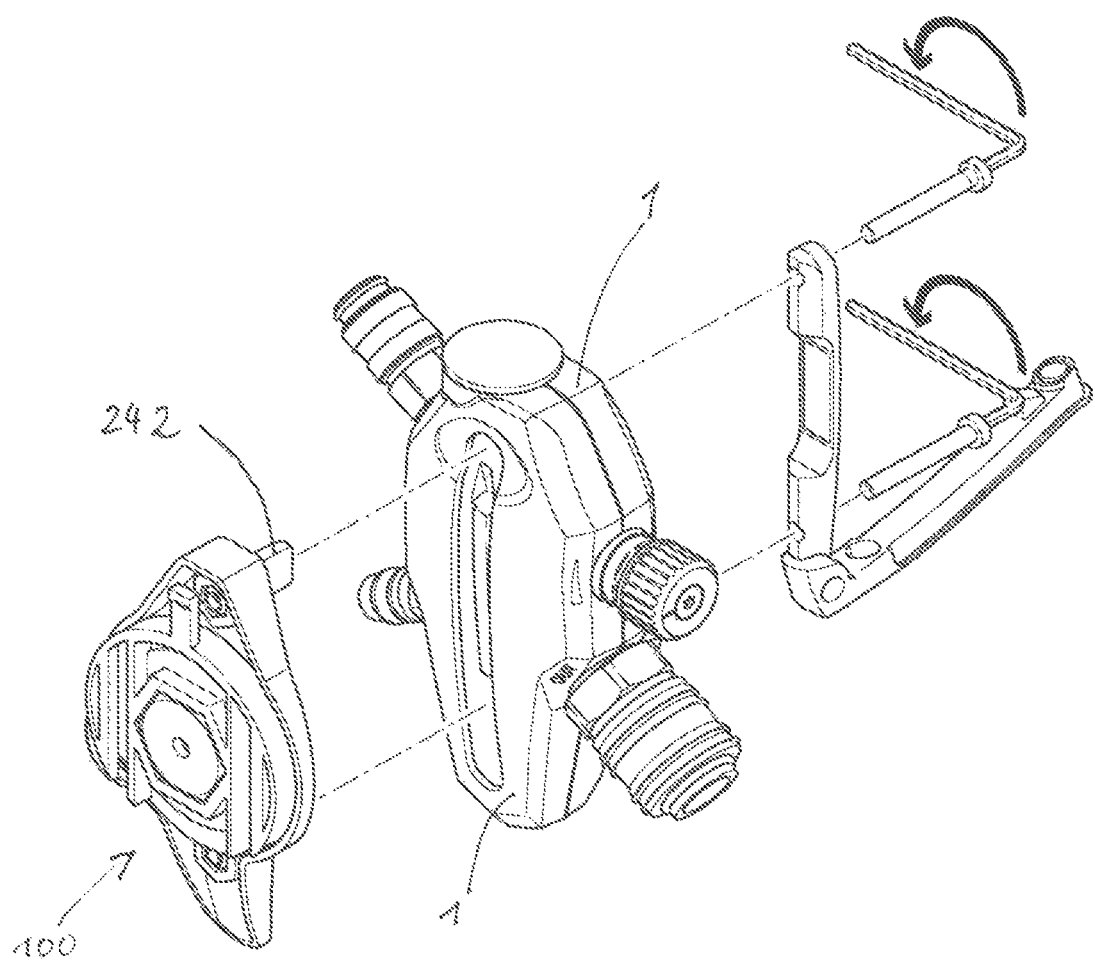
FIG. 3 is a perspective view showing the mounting of the fastening unit with an air regulator unit.
Figure 4A:
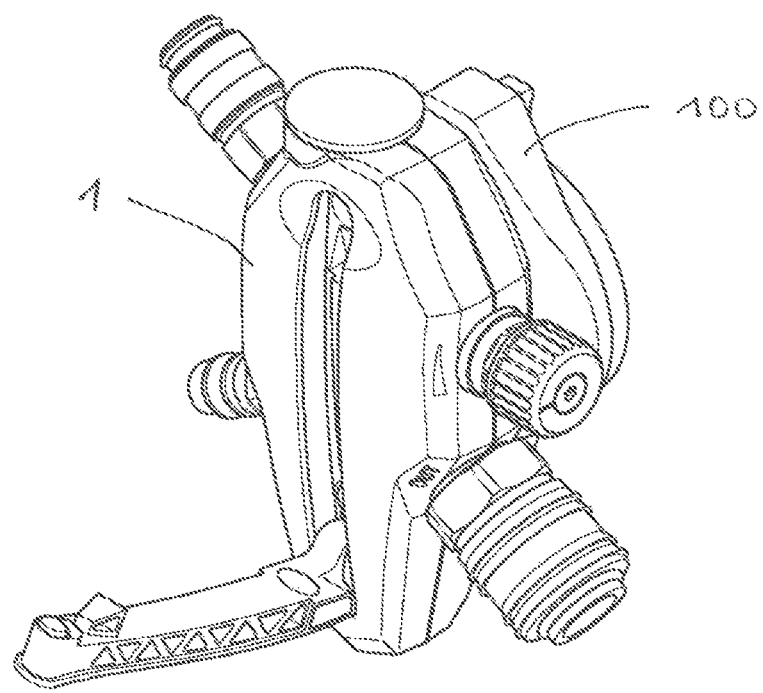
FIGS. 4A and 4B are perspective views showing the fastening unit assembled with the air regulator unit.
Figure 4B:
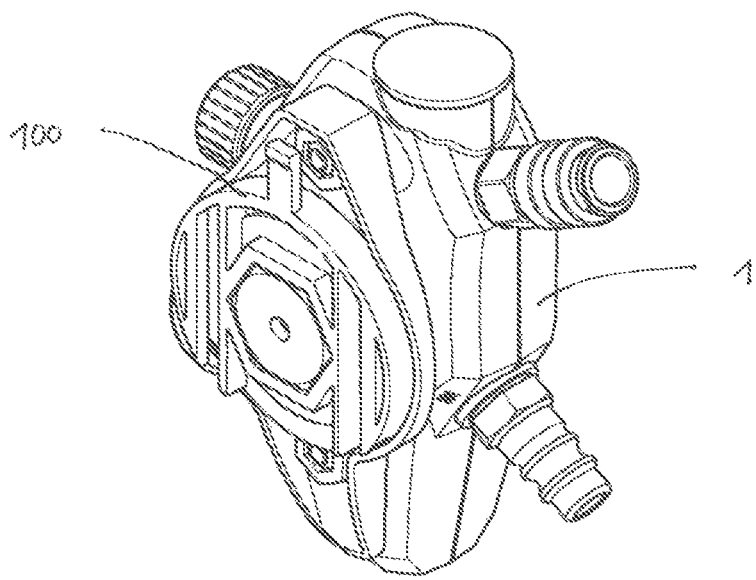
Figure 5A:
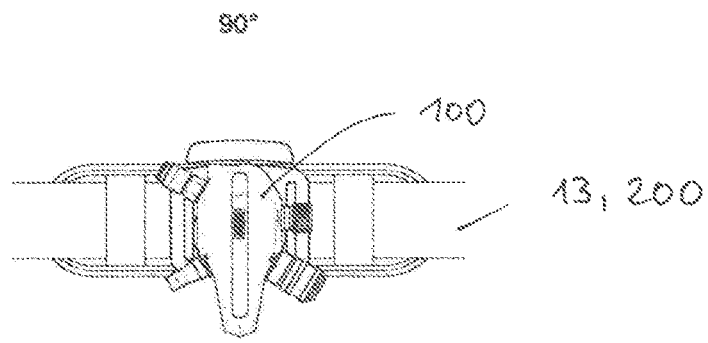
FIGS. 5A to 5E are diagrams showing five different positions of the assembly of FIG. 4A in combination with a hip belt.
Figure 5B:
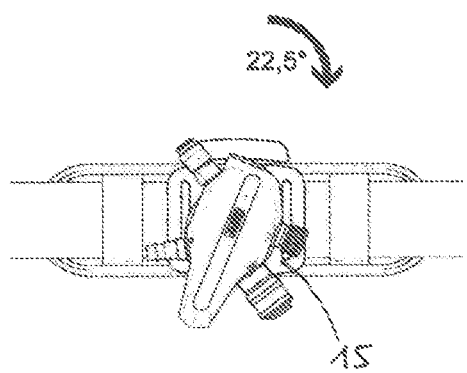
Figure 5C:
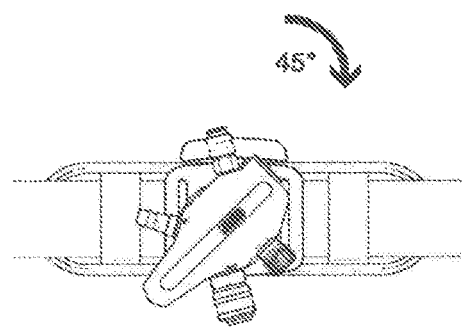
Figure 5D:
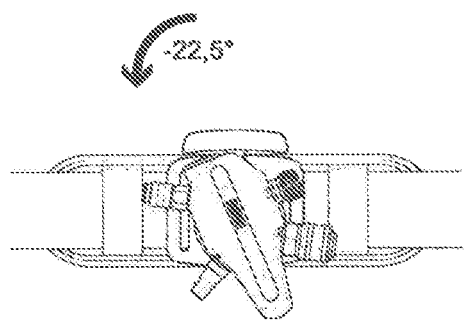
Figure 5E:
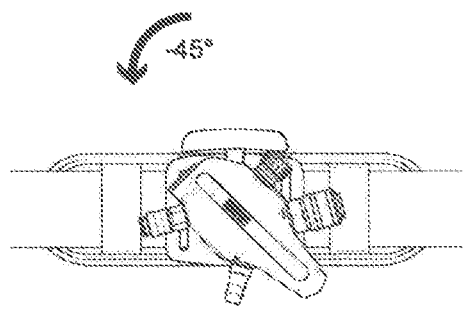

Furthermore, as FIGS. 2A, 2B, and FIG. 3 also show, the fourth section 242 can be inserted into a fastening hole of an air regulator unit 1, which is used as an additional auxiliary module. A screw is inserted into a portion of the fourth hollow section 242 and into a hollow portion of the third section 241 from a side where the second component part 2 with the nut is disposed so that the fastening unit 100 and the air regulator unit 1 are secured to one another as illustrated in 4A and 4B.

In addition, as illustrated in FIG. 2B, the third section 241 has a hexagonal profile so that the nut can be configured in conformity with the third section 241 and can have a hexagonal profile.

As an alternative, although not shown, the second component part can have at least one fastening hole for receiving a fastening means of the additional auxiliary module, with the at least one fastening hole preferably passing through the second substrate.

In addition, as illustrated in FIG. 2B, the head part of the first screw 3, in conformity with the hexagonal profile of the frame 12, can have a hexagonal cross section so that the hexagonal head part of the first screw 3 can be pushed into the frame 12.

As an alternative, although not shown, the head part of the second screw 5 can have a circular outer profile which conforms to the hexagonal inner profile of the frame 12.

The fastening unit 100 is preferably made of plastic material.

Figure 6:
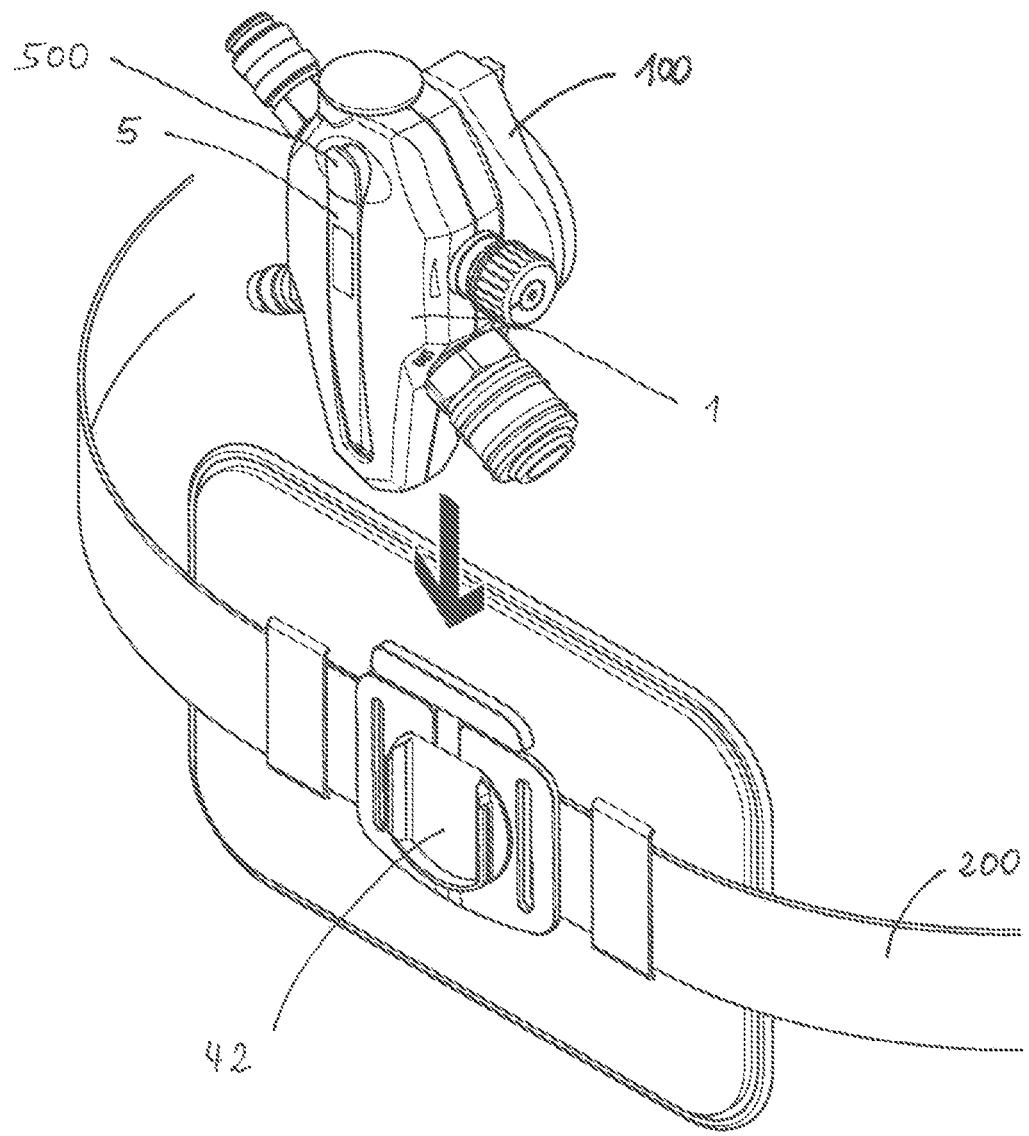
FIG. 6 is a schematic view showing mounting directions for mounting the structure of FIGS. 4A and 5A to 5E on a hip belt.

The fastening unit 100 is exceptionally well-suited to secure the air regulator unit 1, or another unit or module to a waist strap or hip belt 200. As suggested in FIG. 6, the air regulator unit 1, together with the fastening unit 100, can be secured to an adapter 42 of the hip belt 200 by sliding it on from the top. Thus, the projections 13, 16 on the first component part 1 of the fastening unit slide along the adapter 42; and as a projection on the first component part pushes against a tab on the adapter, the up and down movement of the air regulator unit 1 is limited.

All of the explanations above refer to the practical example shown in FIGS. 1 to 6.

Next, the present invention will once again be explained in greater detail with reference to FIGS. 7 to 11 based on another description of the fastening unit, which is also combined with an air regulator unit.

The air regulator unit 100 shown in FIG. 7 comprises a first half shell 2 and a second half shell 3 which form the housing of the air regulator unit 100. The two half shells 2, 3 are connected to one another along a seam line 300. The connection may be a detachable or an undetachable connection. Possible connections are clip-on connections, adhesive connections or welded connections. A fastening unit 4, which is used to secure the air regulator unit 100 to a hip belt 200, is connected to the first half shell 2 of the housing 2, 3. The connection can be a detachable or an undetachable connection. In the practical example at hand, the half shell 2 is detachably connected to the fastening unit 4.

The air regulator unit 100 is fitted with an air inlet connector 7, which allows compressed air to be fed from an external compressed air supply system into the air regulator unit 100. A connector 6 for a hose or the like, which leads to a breathing mask or a breathing hood, is disposed on the same side of the housing 2, 3 as the air inlet connector 7, however, above the air inlet connector 7. In addition, a connector 9 is disposed on the other side of the air regulator unit 100, which connector leads to a compressed air-operated tool, such as a paint spray gun, to which the compressed air is supplied via a hose. Disposed on the same side as the connector 9, however, above this connector, is a regulator 8, which serves to allow the pressure of the air leading to the breathing mask or breathing hood to be adjusted. For safety reasons, the regulator 8 is configured to ensure that the air regulator unit 100 always supplies air at a predefined pressure to the breathing mask or breathing hood, even when the regulator 8 is set to "minimum."

When the air regulator unit 100 is not in use, the connector 6 for connection with a breathing mask or breathing hood and/or the connector 9 for connection with the spray gun can, if desired, be closed with a blank cover plate or the like.

The air regulator unit 100 can preferably be connected to a pressure display (not shown in the figures).

Figure 7A:
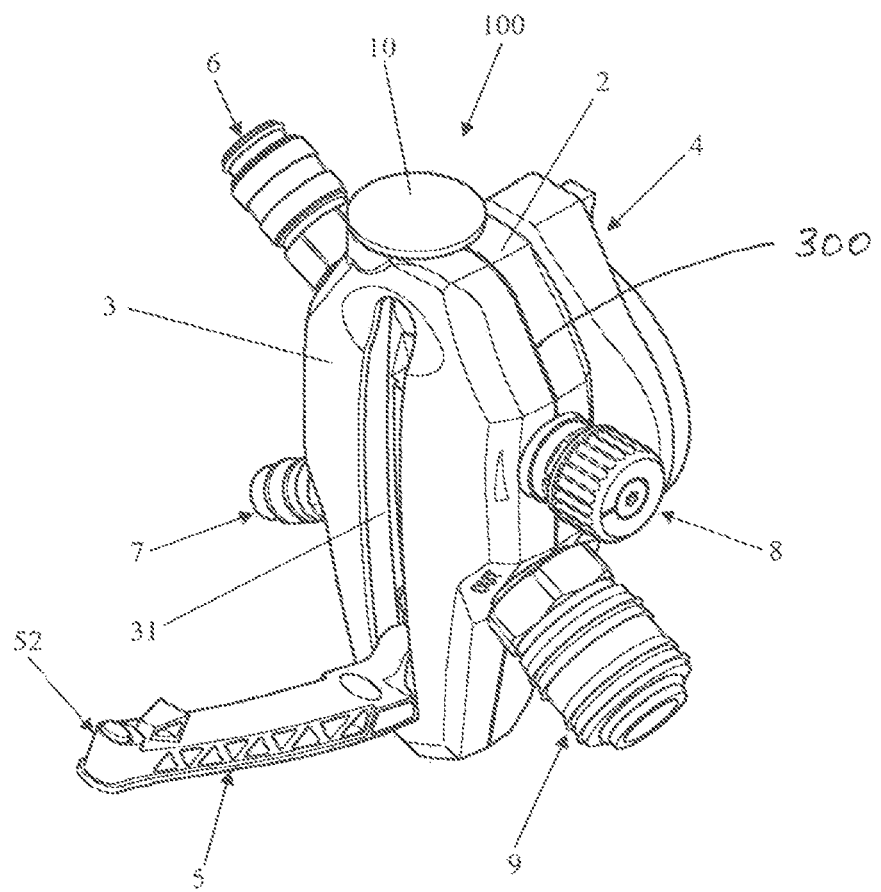
FIG. 7A is a perspective view illustrating a front portion of an air regulator unit connected to the fastening unit according to the present invention.
Figure 8A:
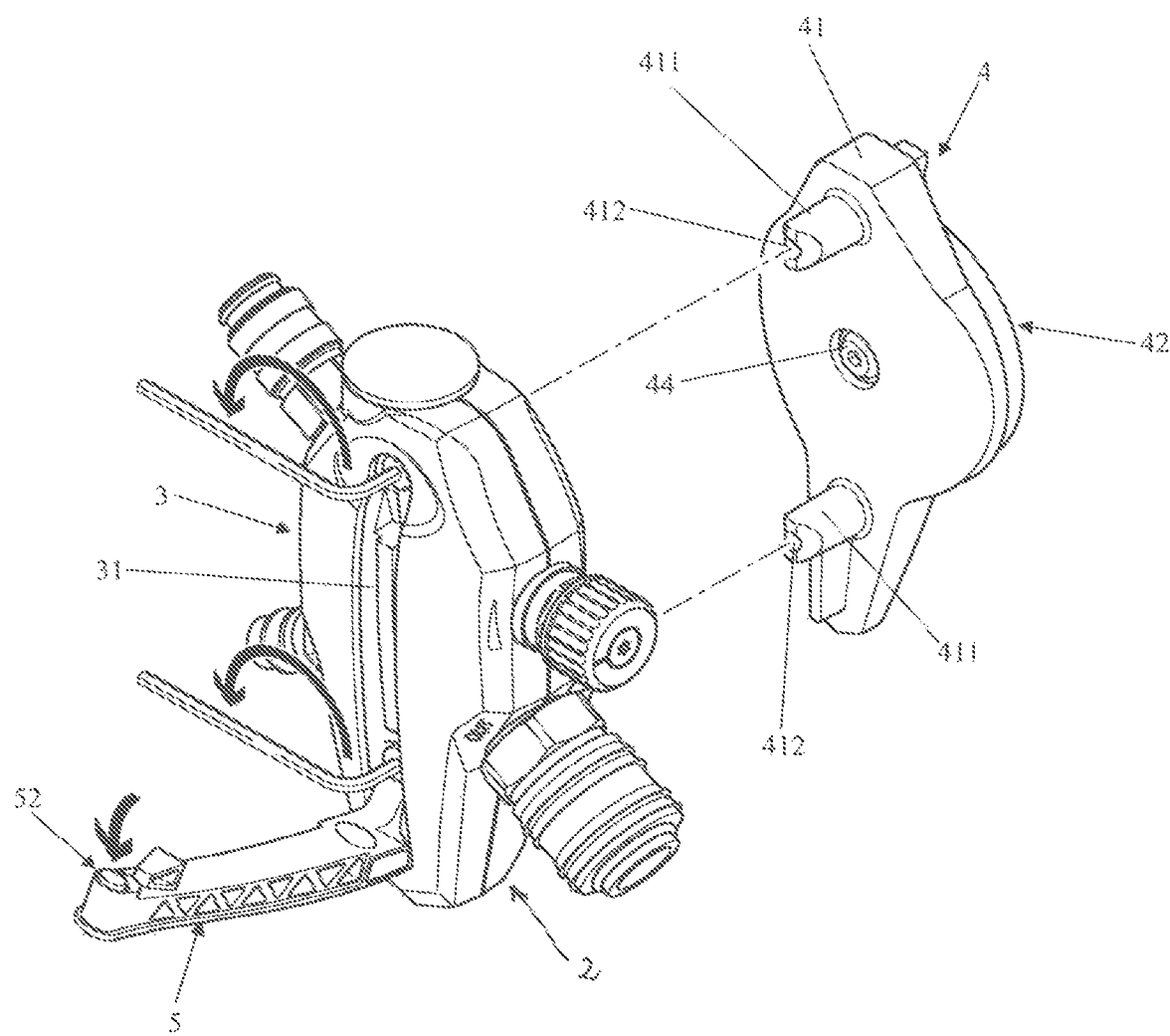
FIG. 8A is a partially exploded perspective view showing the assembly of the air regulator unit.
Figure 8B:
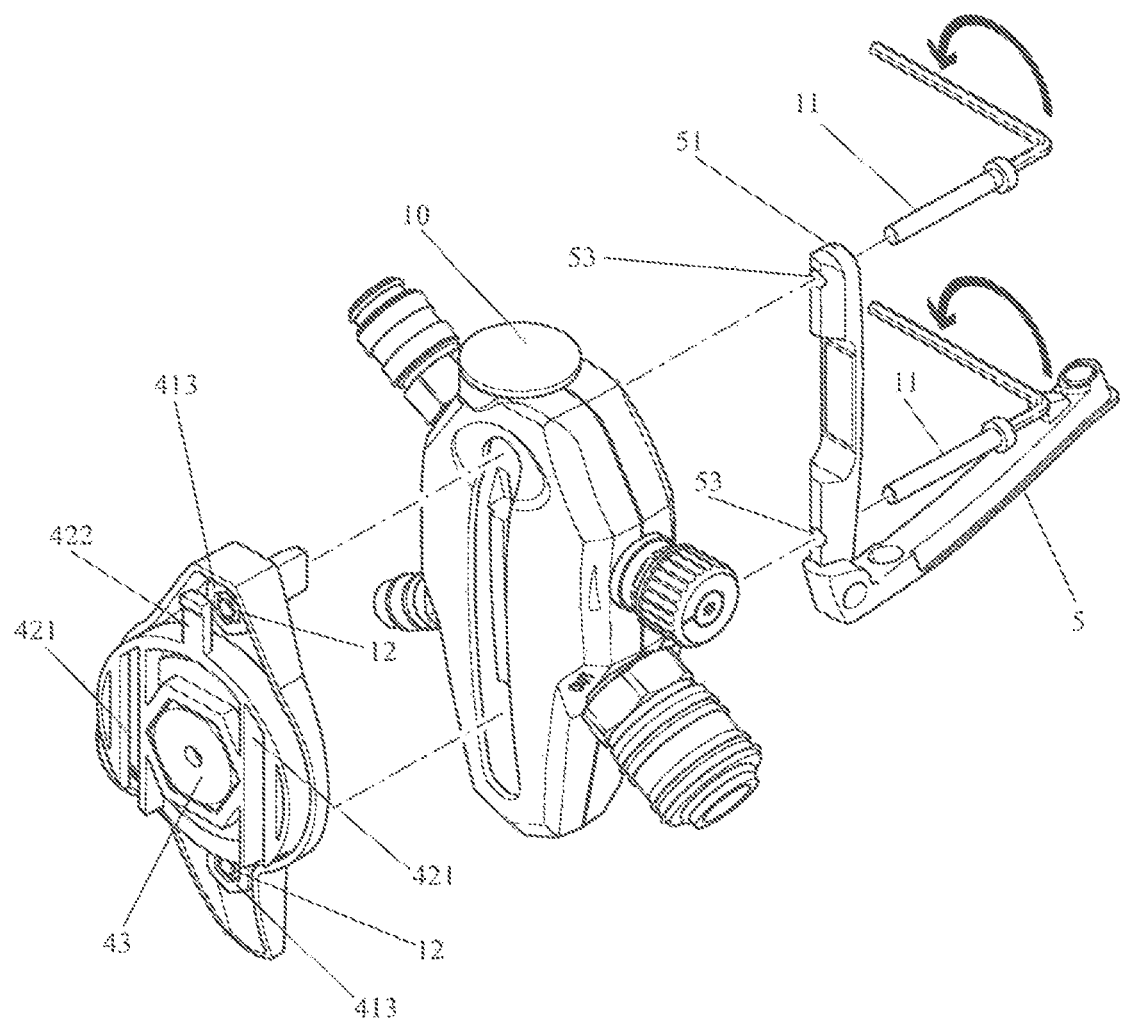
FIG. 8B is an exploded perspective view illustrating a different side of the assembly drawing of FIG. 8A.

In a preferred embodiment, such as shown in greater detail in FIGS. 7A, 8A and 8B, the second half shell 3 of the air regulator unit 100 is fitted with a foldable or rotatable support 5, which can support the spray gun or the breathing air supply hose when the spray gun, or the breathing mask or breathing hood is not in use. As illustrated in FIG. 8B, a first arm of the two-arm support 5 is secured to the air regulator unit 100 by means of a screw 11. The other arm, i.e., the second arm, of the support 5 is hinged to the first arm, but it is free on the other end. It can be rotated relative to the air regulator unit 100.

As illustrated in FIG. 8A, the second arm of the support 5 can be rotated through an angle between 20° to 90°, preferably an angle of 70°. In addition, a first locking element 52, preferably a magnet, is disposed on the free end of the second arm of the support 5. The locking element 52 interacts with a second locking element (preferably with a magnet) which is disposed on the air regulator unit 100. In the practical example at hand, the second locking element is secured to the support 5 in the area of a disk seat 51 which is disposed on the non-free upper end of the first arm of the support 5. In summary, the support 5 in the folded position can be securely supported on the air regulator unit 100 when not in use. And, as shown in FIGS. 7A and 7A a stepped-down groove 31 is configured in the second half shell 3 of the housing. The dimensions of the groove 31 are adapted to the support 5 in such a manner that, except for a tab 500 on the upper end, the second arm in the folded position sits flush in the groove 31.

FIGS. 8A and 8B, respectively, show a front view and a rear view of the fastening unit 4 of the air regulator unit 100. The fastening unit 4 comprises connecting elements 41, 42 suitable to connect the first half shell 2 of the housing of the air regulator unit 100 to an adapter 15 which is part of a hip belt 200 (see FIG. 10).

As illustrated in FIGS. 8A and 8B, the first connecting element 41 of the fastening unit 4, which in the practical example at hand has a substantially oval profile, comprises two hollow projections 411, which are disposed on the top and on the bottom of the connecting element 41 and which project in the direction of the first half shell 2 of the housing of the air regulator unit. A fastening bore 412 is configured into each projection 411. The first half shell 2 comprises complementary fastening holes, into which the projections 411 can be inserted. As FIG. 8B illustrates, screws 11 are used, which pass through fastening holes 53 configured into the disk seats 51 disposed on the on top and on the bottom of the first arm of the support 5 and subsequently through fastening holes in the first half shell 2 and into the second half shell 3 of the housing of air regulator unit 100. The fastening unit 4 is secured to the projections 411 by means of bolts 12. To ensure an especially secure attachment, bolt seats 413 for screws or the like are provided.

Figure 9A:
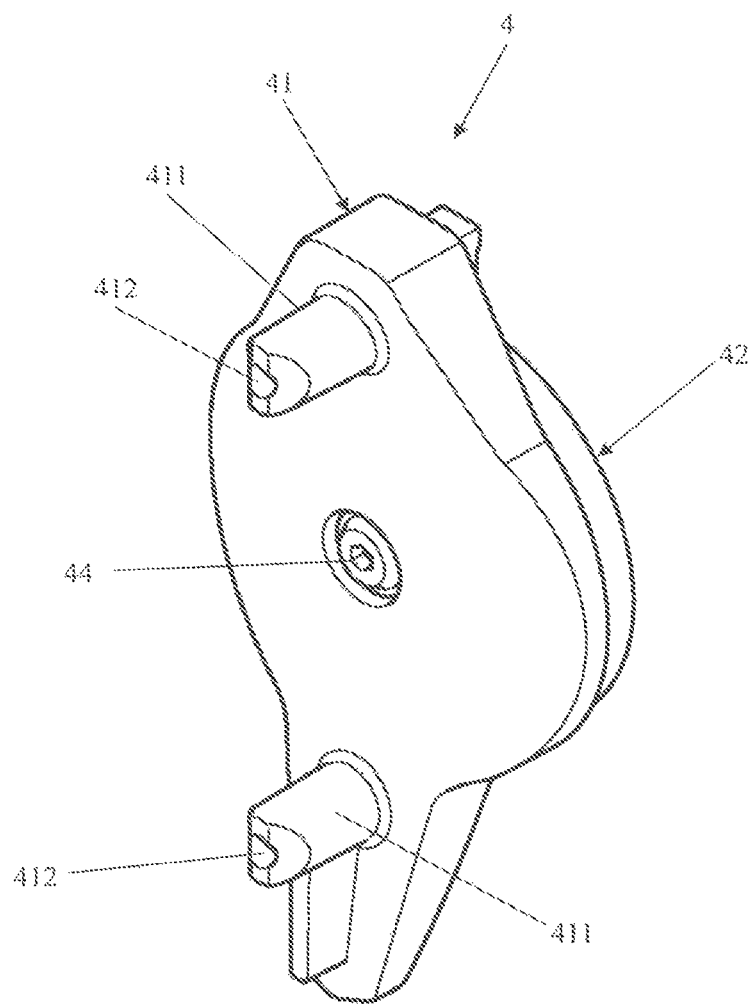
FIG. 9A is a perspective view illustrating the fastening unit of the air regulator unit.
Figure 9B:
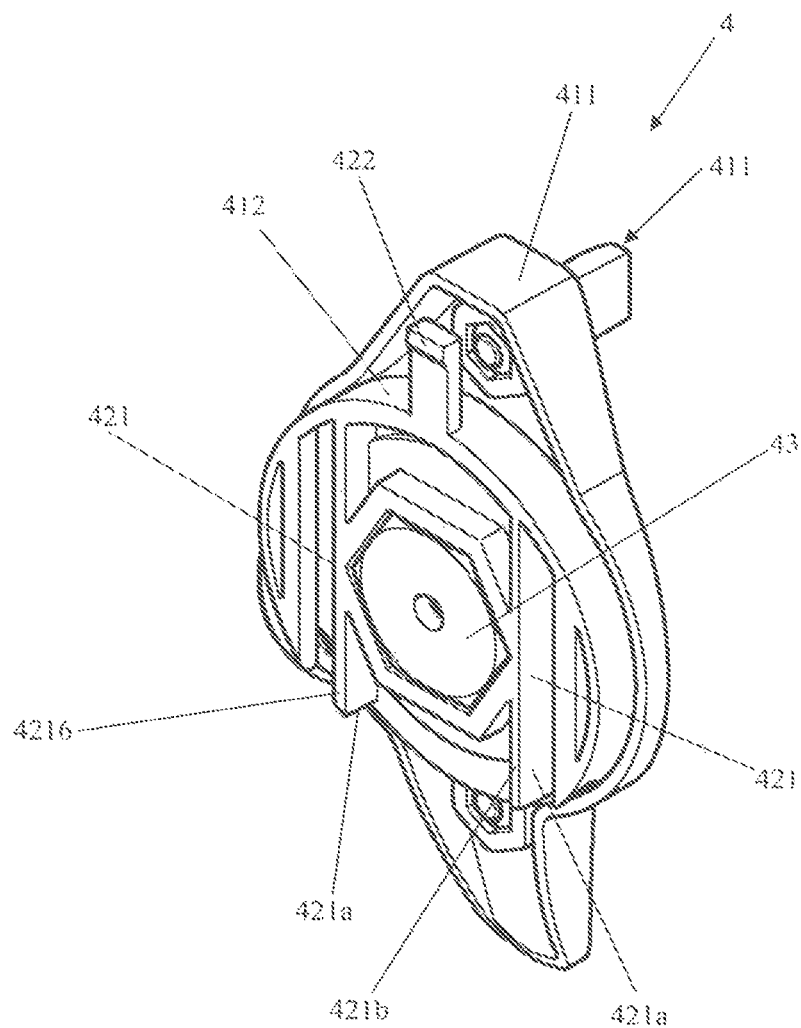
FIG. 9B is a perspective view showing a different side of the fastening unit.

As shown in FIG. 9B, two sliding slots 421 are provided in the adapter area 42 of the fastening element 4. The adapter area 42 has a circular profile. A stop contact 422 projects outwardly from the circumferential surface of the adapter area 42 on the upper side of the adapter area 42. Two parallel projections 421b which project from the circular area near the center of the adapter 42 form the upper surface of an inner wall 421a for one of the two sliding slots 421. Using this arrangement according to the invention, it is possible to connect the air regulator unit 100 to the hip belt 200.

Figure 10:
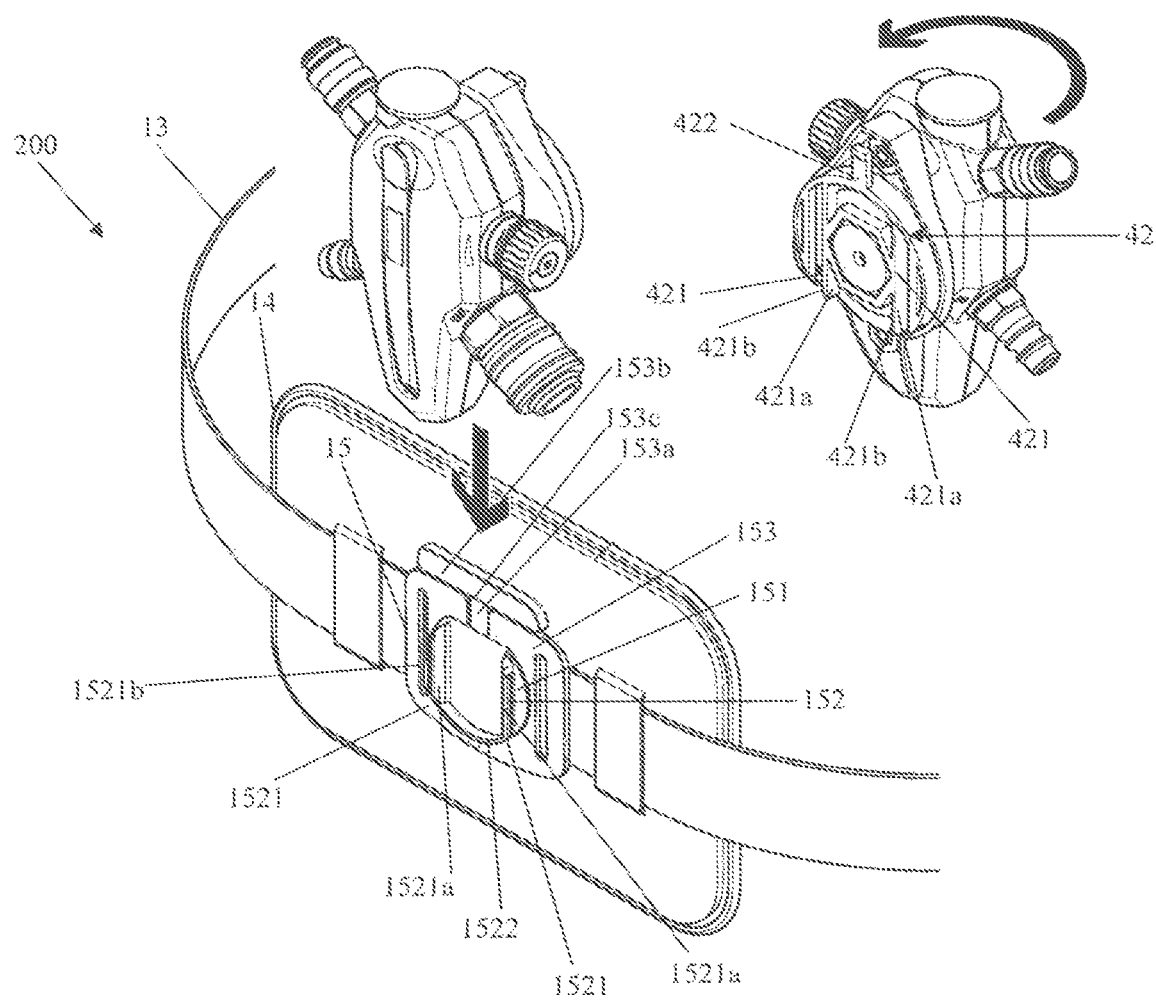
FIG. 10 is a schematic perspective view showing the fastening of the fastening unit with the air regulator unit to a hip belt; and, FIG. 11 is a schematic perspective view showing the removal of the fastening unit with the air regulator unit from the hip belt.
Figure 11:
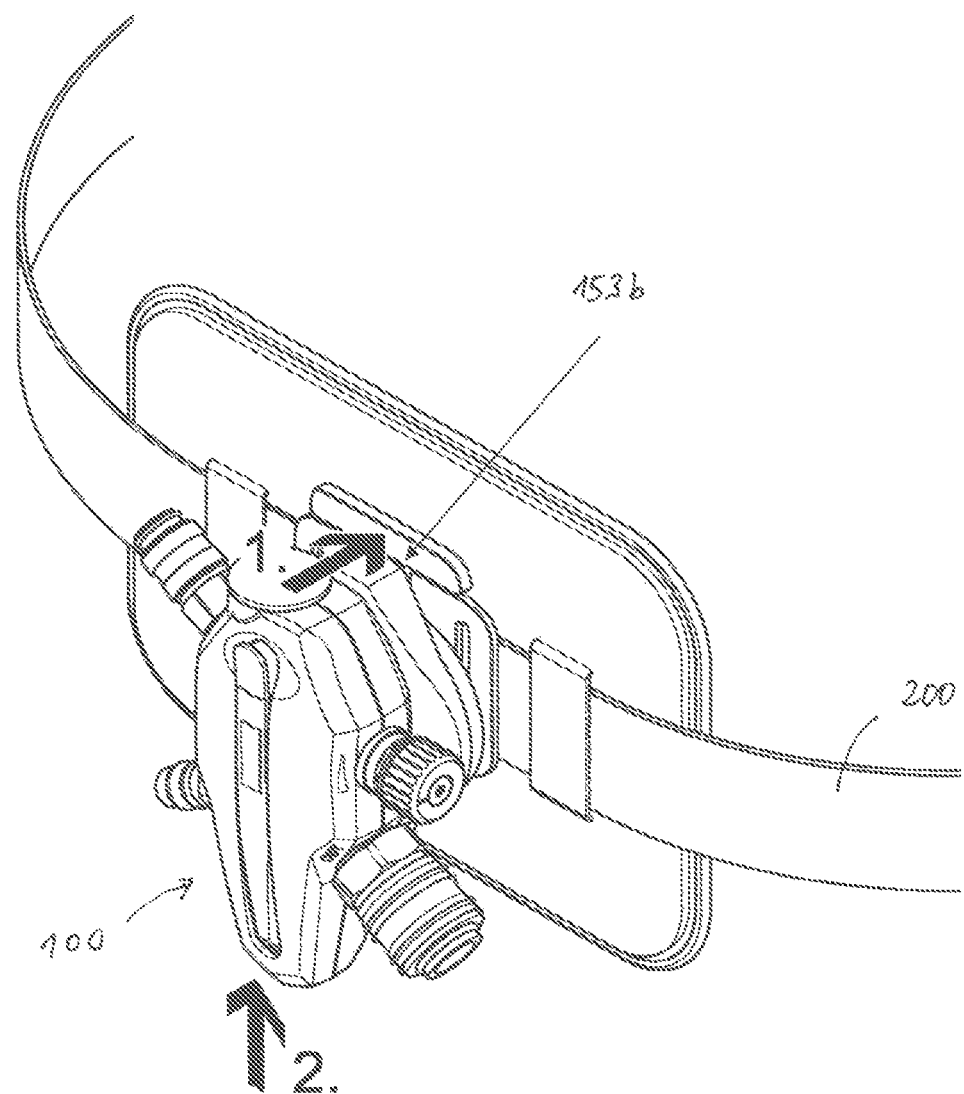

The hip belt 200, shown FIGS. 10 and 11, comprises a waist strap 13 having an inwardly facing surface, which is padded with a cushion 14. On the outwardly-facing surface of the waist strap 13, an adapter 15 is disposed for the fastening unit 4 of the air regulator unit 100.

The adapter 15 comprises a carrier plate 151, a fastening plate 152 supported by the carrier plate 151 and a release mechanism 153. The adapter 15 comprises two guide rails 1521, the positions and shapes of which are coordinated so as to conform to the two sliding slots 421 in the adapter area 42 of the fastening element 4. A stop element 1522 connects the lower ends of the two guide rails 1521; thus, the stop 1522 element and the two guide rails 1521 form a substantially "U" shape. Each guide rail 1521 comprises a fin 1521a, which projects from the fastening plate 152. The two fins 1521a are disposed on the fastening plate 152 along the longitudinal direction of the waist strap 13 and extend parallel to one another along the width direction of the waist strap 13. The upper portion of each fin 1521a has a projection 1521b which projects outwardly in the longitudinal direction of the waist strap. On the fastening plate 152, each projection 1521b defines a guide or bracket for the sliding slots 421 in the adapter area 42 of the fastening element 4.

The release mechanism 153 comprises a one-arm lever 153a and a handle 153b, which is connected to the lever 153a. As FIG. 10 illustrates, the lever 153a is disposed in a recess on the upper portion of the fastening plate 152. The lever 153a is made of a relatively flexible material, which ensures that it can be deformed when pressure is excerted on the handle 153b. In the practical example at hand, the lever 153a, is integrally formed in one piece with the fastening plate 152 and is cut out of the plate 152. The handle 153b is integrally formed in one piece with the upper end of the lever 153a. In the practical example at hand, the surface of the handle 153b is larger than the surface of the lever, which causes a stop surface 153c to be formed between the handle 153b and the lever 153a.

FIG. 10 shows in greater detail how the air regulator unit 100 can be fastened to, and subsequently released from, the hip belt 200 in the adapter area 42 of the fastening unit 4 by means of the adapter 15 on the hip belt. After appropriate alignment, the guide rails 1521 on the fastening plate 152 of the adapter 15 can be inserted into the sliding slots 421 in the adapter area 42 of the fastening unit 4 by a downwardly directed pressure which by moving the air regulator unit 100 downwardly in the direction of the arrow 1 (FIG. 10). Since this causes the projections 421b of the sliding slots 421 and the projections 1521b of the guide rails 1521 to interlock, the air regulator unit 100 is securely fastened to the hip belt 200. The stop element 1522 on the adapter 15 limits the sliding movement sin the downward direction, thereby preventing an undesirable drop of the air regulator unit 100. The upper end of the stop contact 422 on the fastening unit 4 prevents the stop surface 153c of the release mechanism 153 of the adapter 15 from making undesirable contact with the air regulator unit 100.

As illustrated in in FIG. 11, the air regulator unit 100 can be easily removed from the hip belt 200. By pushing the handle 153b in the direction of the arrow 1 (FIG. 11), i.e., toward the wearer of the hip belt 200, which causes the stop contact 422 on the fastening unit 4 to make contact with the stop surface 153c of the lever 153a, the release mechanism 153 is actuated, and the air regulator unit 100 can be removed by moving it upwardly in the direction of the arrow 2 (FIG. 11).

Although the embodiment describes and shows only an example of sliding slots 421 in the adapter area 42 of the fastening unit 4 and guide rails 152 on the adapter 15 of the hip belt 200, it is also possible for sliding slots to be disposed on the adapter for guide rails to be disposed on the fastening unit. Other types of sliding or push-in connections or any other detachable connection, such as clip-on or snap-in connections, can be used as well.

As illustrated in FIGS. 9A and 9B, the adapter 42 and the connecting element 41 of the fastening unit 4 are connected to one another by means of a thin hexagonal nut 43 and a screw 44. Since the adapter 42 is connected to the connecting element 41, the air regulator unit 100 (or another module secured to the fastening unit 4) can be rotated relative to the hip belt 200 (see FIGS. 5A to 5E of the previous practical example). This contributes to further increasing the comfort of the operator.

Figure 7B:
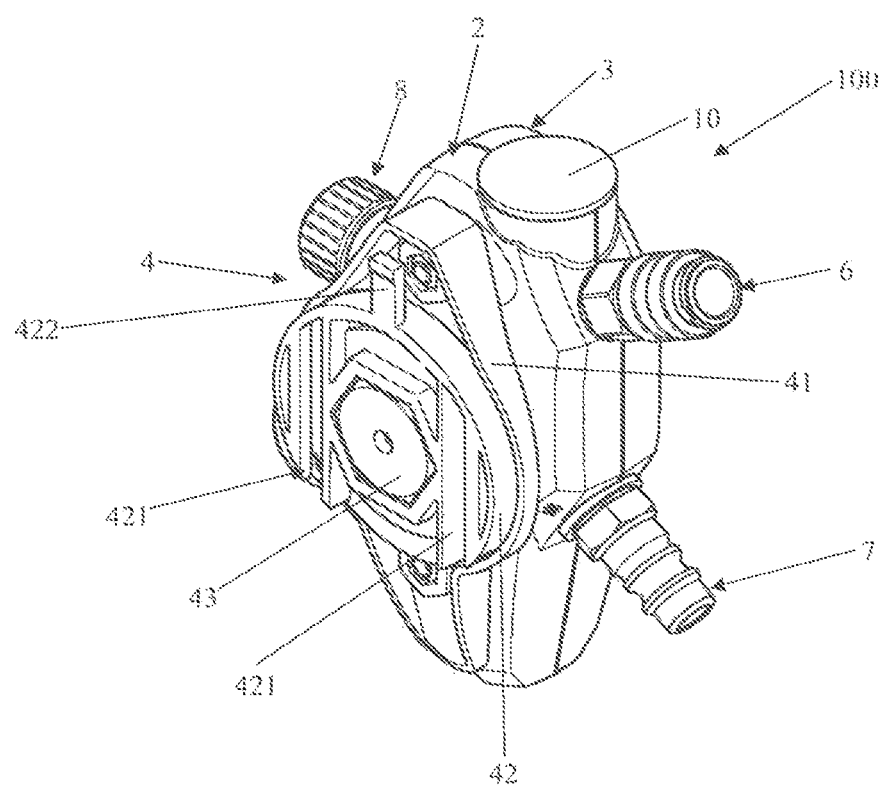
FIG. 7B is a perspective view illustrating a rearward side of the air regulator unit of FIG. 7A.

In addition, as shown in FIGS. 7A and 7B, the air regulator unit 100 is fitted with a color code system disk 10 (CCS disk). In the practical example at hand, a circular recess is configured into the upper surface of the housing 2, 3 of the air regulator unit 100, into which recess the circular color code system disk 10 can be clipped.

Individual air regulator units 100 can be personalized with color code system disks 10 of different colors. This also allows individual air regulator units to be easily dedicated to individual breathing masks or breathing hoods. Other types of fastening means and forms of color code systems are, of course, also possible.

It goes without saying that identification means other than color code system disks can be used as well. Using some identification means will definitely further improve the safety of respiratory protection systems.

All elements or subelements of the air regulator unit 100 are preferably made of a plastic material. In another possible embodiment, the two half shells 2, 3 of the housing can have different colors. By matching the colors or the half shells to the colors of the hip belt and/or of the adapter 15, assembly errors can be nearly completely ruled out.

According to another embodiment of the invention, the adapters described by the present invention are disposed in a plurality of places on the hip belt. This allows a plurality of air cleaning units of the same type, or of different types, such as air heater modules, air humidifier modules, or activated charcoal adsorbent modules, which are fitted with a fastening unit according to the present invention and/or which have the same or a similar configuration in the housing area as the above-described air regulator unit, to be readily secured to the hip belt.

It is recommended that two places be chosen which, when the user is wearing the waist belt, are subsequently located on the left side and on the right side of the waist of the user. This makes it possible for users to switch the air cleaning units from one side to the other side, thereby allowing the belt unit to be readily used both by left-handers and by right-handers.

Finally, it should once again be emphasized that all that is said above describes solely preferred. embodiments of the present invention, without however limiting the present invention to these embodiments. To those skilled in the art, other variations and modifications may be conceivable. All modifications, equivalent substitutions and improvements, which fall within the spirit of the invention and which are based on the principle of the invention, shall be covered by the protective scope of the invention.

The invention claimed is:

1. A fastening unit for securing a first module relative to a second module, the fastening unit comprising a first component part for assembly with the second module and a second component part for assembly with the first module,
    wherein the second component part with the first component part is rotatable about a predefined angle relative to the first component part; and first and second subcomponents within the range of the predefined angle are engageable to each other in a plurality of discrete positions,
    wherein the first component part comprises a stop and the second component part comprises a guide groove, with the stop movable within the guide groove to provide rotation of the second component part relative to the first component part about the predefined angle, and wherein one of the first and second component parts includes a locking groove and the other of the first and second component parts includes a locking pin insertable into the locking groove so as to lock the second component part in one of the plurality of discrete positions.

2. The fastening unit as in claim 1, wherein the first component part comprises a first substrate, through which a central through-hole passes and wherein the stop is disposed on a surface of the first substrate such that the stop faces the second component part.

3. The fastening unit as in claim 2, wherein the first component part has a substantially cylindrical contour.

4. The fastening unit as in claim 1, wherein the predefined angle is less than 180 degrees.

5. The fastening unit as in claim 4, wherein the predefined angle is 22.5 degrees and/or −22.5 degrees, and/or 45 degrees and/or −45 degrees.

6. The fastening unit as in claim 1, wherein the fastening unit is made of plastic material.

7. The fastening unit as in claim 1, wherein the second module is an adapter on a hip belt.

8. The fastening unit as in claim 1, wherein the first module is an air regulator unit.

9. The fastening unit as in claim 8, wherein the air regulator unit comprises:
an air inlet connector for receiving compressed air from an air supply unit;
a connector for connecting to a breathing mask or breathing hood;
an adapter secured on a body, or on or to a housing of the air regulator unit and which provides a detachable connection, in particular a push-in or sliding connection, with another component.

10. The fastening unit as in claim 9, wherein the adapter has one or a plurality of sliding slots for enabling a sliding connection with respective guide rails of the other component.

11. The fastening unit as in claim 10, wherein the air regulator module comprises an identification element.

12. The fastening unit as in claim 10, wherein the housing of the air regulator unit is made of plastic material.

13. The fastening unit as in claim 12, wherein the housing of the air regulator unit is composed of two half parts.

14. The fastening unit as in claim 9, wherein the adapter has one or a plurality of sliding slots for enabling a sliding connection with respective sliding slots of the other component.

15. The fastening unit as in claim 9, wherein at least one projection is provided, said projection being capable of enclosing and of being enclosed.

16. The fastening unit as in claim 9, wherein structure comprising the fastening unit and the housing is configured so as to be able to rotate.

17. The fastening unit as in claim 16, wherein the housing is configured so as to engage in an adapter in a plurality of rotational angle positions.

18. The fastening unit as in claim 9, wherein an adapter having a stop contact is provided, which stop contact is able to block a stop contact of another component after the adapter has established a sliding connection with the other component.

19. The fastening unit as in claim 9, wherein the air regulator unit is connectable to a pressure display.

20. The fastening unit as in claim 9, wherein the air regulator unit comprises a connector for connecting to a compressed air-operated tool, such as a paint spray gun or the like.

21. The fastening unit as in claim 8, wherein the air regulator unit comprises a support.

22. The fastening unit as in claim 21, wherein the support, at least in certain portions thereof, is secured so as to be able to pivot relative to the housing.

23. The fastening unit as in claim 22, wherein an angle of pivot is between 20 degrees and 90 degrees.

24. The fastening unit as in claim 23, wherein the angle of pivot is 70 degrees.

25. The fastening unit as in claim 22, wherein a locking element is disposed on a free end of the support and a corresponding locking element is disposed on the housing so that the free end is locked on the housing when the support is folded.

26. The fastening unit as in claim 25, wherein the locking elements are magnets.

27. The fastening unit as in claim 1 in combination with a belt unit.

28. The fastening unit as in claim 27, wherein the belt unit comprises at least one adapter able to establish a detachable sliding connection with an air regulator unit and/or with the fastening unit.

29. The fastening unit as in claim 28, wherein the belt unit comprises a release mechanism for the air regulator unit and/or for the fastening unit.

30. The fastening unit as in claim 29, wherein the release mechanism is a lever mechanism.

31. The fastening unit as in claim 30, wherein the lever is connected to the adapter.

32. The fastening unit as in claim 31, wherein the lever has one arm and is cut out of a part of the adapter.

33. The fastening unit as in claim 31, wherein the lever is made of a flexible material.

34. The fastening unit as in claim 30, wherein the lever comprises a handle.

35. The fastening unit as in claim 34, wherein at least one stop surface is disposed between the lever and the handle.

36. The fastening unit as in claim 28, wherein at least one guide rail and at least one stop element are provided.

37. The fastening unit as in claim 28, wherein at least one guide groove and at least one stop element are provided.

38. The fastening unit as in claim 28, wherein at least one support area is provided.

39. The fastening unit as in claim 28, wherein by bringing in contact of the stop contact on the fastening unit with the stop surface of the lever by pushing the handle, then the release mechanism is actuated, and the air regulator unit is removable from the belt unit.

40. The fastening unit as in claim 28, wherein on a side facing the fastening unit, the air regulator unit is padded with a cushion.

41. The fastening unit as in claim 28, wherein a connection to the fastening unit is possible in a plurality of places.

42. A fastening unit for securing a first module relative to a second module, the fastening unit comprising a first component part for assembly with the second module and a second component part for assembly with the first module,
wherein the second component part with the first component part is rotatable about a predefined angle relative to the first component part; and first and second subcomponents within the range of the predefined angle are engageable to each other in a plurality of positions, wherein the first component part comprises a first substrate, through which a central through-hole passes and which comprises a stop disposed on a surface of the first substrate such that the stop faces the second component part, wherein the second component part comprises a second substrate, a first hollow projection passing through the second substrate and is insertable into the central through-hole, and wherein a second projection encloses the first projection, with the second projection comprising a first section and a second section, with an inside circumferential wall of the first section lying opposite to an outside circumferential wall of the first projection, and with an inside circumferential wall of the second section and an outside circumferential wall of the first projection defining a guide groove for the stop, and with the first section, the second section, the first projection and the stop being assembled such that the second component part is rotatable about the predefined angle relative to the first component part.

43. The fastening unit as in claim 42, wherein the first component part comprises at least one locking groove disposed on the surface of the first substrate.

44. The fastening unit as in claim 43, wherein the second component part comprises at least one locking pin insertable into the at least one locking groove so as to lock the second component part in place in engaged positions.

45. The fastening unit as in claim 43, wherein the at least one locking groove comprises a plurality of locking grooves disposed in pairs.

46. The fastening unit as in claim 45, wherein the second component part comprises two locking pins which are insertable into each pair of locking grooves so as to lock the second component part in place in engaged positions.

47. The fastening unit as in claim 42, wherein the first projection is higher than the second projection so that only a portion of the first projection is able to engage in the central through-hole.

48. The fastening unit as in claim 42, further comprising a first screw with a first head part and a first hollow screw extension, a spring, and a second screw with a second head part and a hollow screw extension, wherein the first hollow screw extension receives the second hollow screw extension and the spring slides onto the first hollow screw extension.

49. The fastening unit as in claim 48, wherein the first screw is sequentially insertable into the central through-hole and into a hollow portion of the first projection from a side where the first component part is located and wherein the spring and the second screw as an assembled unit may be sequentially inserted into the hollow portion of the first projection from a side where the second component part is disposed so as to be assembled together with the first screw.

50. The fastening unit as in claim 48, wherein the first component part comprises a frame surrounding the central through-hole.

51. The fastening unit as in claim 50, wherein the frame has a hexagonal profile.

52. The fastening unit as in claim 51, wherein the head part of the first screw has a hexagonal outer profile.

53. The fastening unit as in claim 50, wherein the head part of the first screw has an outer profile that conforms to an inner profile of the frame.

54. The fastening unit as in claim 53, wherein the head part of the first screw has a circular outer profile.

55. The fastening unit as in claim 42, wherein the second component part comprises at least one fastening part which is connectable to the first module.

56. The fastening unit as in claim 55, wherein each of the at least one fastening part comprises a third profile and a fourth profile, with the third profile being positioned on a surface where the first projection is located, and with the fourth profile being positioned on a different substrate and opposite to the first projection.

57. The fastening unit as in claim 56, wherein the fourth profile is insertable into the fastening hole of the first module and wherein a screw is inserted into a hollow portion of the fourth profile and into a hollow portion of the third profile, and is secured by a nut.

58. The fastening unit as in claim 57, wherein the at least one fastening part comprises a first fastening section and a second fastening section, with the first fastening section being disposed on an upper end of the second component part, and with the second fastening section being disposed on a lower end of the second component part.

59. The fastening unit as in claim 42, wherein the second component part comprises at least one fastening hole for receiving a fastening part of the first module and wherein the fastening hole passes through the second substrate.

\* \* \* \* \*